(12) United States Patent
Lin

(10) Patent No.: US 12,512,142 B2
(45) Date of Patent: Dec. 30, 2025

(54) THREE-DIMENSIONAL INTEGRATED CIRCUIT

(71) Applicant: Winbond Electronics Corp., Taichung (TW)

(72) Inventor: Chih-Feng Lin, Hsinchu (TW)

(73) Assignee: Winbond Electronics Corp., Taichung (TW)

( * ) Notice: Subject to any disclaimer, the term of this patent is extended or adjusted under 35 U.S.C. 154(b) by 260 days.

(21) Appl. No.: 18/353,116

(22) Filed: Jul. 17, 2023

(65) Prior Publication Data
US 2024/0412769 A1  Dec. 12, 2024

(30) Foreign Application Priority Data

Jun. 7, 2023  (TW) .................................. 112121328

(51) Int. Cl.
| | |
|---|---|
| *G11C 7/00* | (2006.01) |
| *G11C 11/406* | (2006.01) |
| *H01L 23/34* | (2006.01) |
| *H01L 23/48* | (2006.01) |
| *H01L 23/528* | (2006.01) |
| *H01L 25/18* | (2023.01) |
| *H10B 80/00* | (2023.01) |
| *H01L 23/00* | (2006.01) |

(52) U.S. Cl.
CPC ........ *G11C 11/40626* (2013.01); *H01L 23/34* (2013.01); *H01L 23/481* (2013.01); *H01L 23/528* (2013.01); *H01L 25/18* (2013.01); *H10B 80/00* (2023.02); *H01L 24/13* (2013.01); *H01L 24/16* (2013.01); *H01L 24/17* (2013.01); *H01L 2224/13025* (2013.01); *H01L 2224/16146* (2013.01); *H01L 2224/17181* (2013.01)

(58) Field of Classification Search
CPC ... G11C 11/40626; H10B 80/00; H01L 23/34; H01L 23/481; H01L 23/528; H01L 25/18; H01L 24/13; H01L 24/16; H01L 24/17; H01L 2224/13025; H01L 2224/16416; H01L 2224/17181
USPC .......................................................... 365/222
See application file for complete search history.

(56) References Cited

U.S. PATENT DOCUMENTS

| | | | |
|---|---|---|---|
| 9,286,991 B1 * | 3/2016 | Walker ..................... | H01L 22/10 |
| 10,503,656 B2 * | 12/2019 | Hijaz ........................ | G06F 11/34 |
| 10,878,881 B1 * | 12/2020 | Hsu ............................ | G11C 5/04 |

(Continued)

FOREIGN PATENT DOCUMENTS

| | | |
|---|---|---|
| CN | 110010174 | 7/2019 |
| TW | 202121173 | 6/2021 |

OTHER PUBLICATIONS

"Office Action of Taiwan Counterpart Application", issued on Apr. 9, 2024, p. 1-p. 5.

*Primary Examiner* — Viet Q Nguyen
(74) *Attorney, Agent, or Firm* — JCIPRNET

(57) ABSTRACT

A 3-dimensional (3D) integrated circuit (IC) is provided. The 3D IC includes a plurality of chips, at least one through silicon via (TSV) structure, and a temperature sensor. The chips are stacked in the 3D IC. The TSV structure penetrates the chips. The temperature sensor is disposed in a first chip of the chips. The temperature sensor is disposed close to the TSV structure, and is configure to sense a temperature sensing result corresponding to a temperature of the TSV structure.

13 Claims, 2 Drawing Sheets

(56) References Cited

U.S. PATENT DOCUMENTS

| | | | | |
|---|---|---|---|---|
| 2012/0163413 | A1* | 6/2012 | Kim | H01L 23/5258 |
| | | | | 257/467 |
| 2014/0022002 | A1* | 1/2014 | Chua-Eoan | G06F 1/206 |
| | | | | 327/512 |
| 2014/0059550 | A1* | 2/2014 | Yoshihara | G06F 9/5016 |
| | | | | 718/100 |
| 2015/0019805 | A1* | 1/2015 | Ichikawa | G06F 11/3037 |
| | | | | 711/106 |
| 2015/0129898 | A1* | 5/2015 | Hook | H01L 21/324 |
| | | | | 438/26 |
| 2015/0369764 | A1* | 12/2015 | Chang | G01K 1/16 |
| | | | | 374/1 |
| 2016/0146752 | A1* | 5/2016 | Roelver | G01N 27/4166 |
| | | | | 438/49 |
| 2016/0161550 | A1* | 6/2016 | Yeric | H01L 22/30 |
| | | | | 324/750.01 |
| 2016/0300816 | A1* | 10/2016 | Park | H01L 25/18 |
| 2017/0093361 | A1* | 3/2017 | Grosjean | H03H 3/0077 |
| 2019/0161341 | A1* | 5/2019 | Howe | G11C 5/04 |
| 2019/0226921 | A1* | 7/2019 | Zivkovic | G01K 11/24 |
| 2020/0135697 | A1* | 4/2020 | Brewer | H10B 12/50 |
| 2021/0239688 | A1* | 8/2021 | Chang | G01N 27/4145 |
| 2023/0121072 | A1* | 4/2023 | Lee | H01L 23/34 |
| | | | | 713/300 |

* cited by examiner

THREE-DIMENSIONAL INTEGRATED CIRCUIT

CROSS-REFERENCE TO RELATED APPLICATION

This application claims the priority benefit of Taiwan application no. 112121328, filed on Jun. 7, 2023. The entirety of the above-mentioned patent application is hereby incorporated by reference herein and made a part of this specification.

BACKGROUND

1. Technical Field

The present invention is related to a circuit, more particularly to a three-dimensional integrated circuit (3D IC).

2. Description of Related Art

As 3D ICs are widely used in the application of memory, the heat flow of the chip has gradually become one of the important issues when designing the memory. Because the operation in the memory is highly sensitive to temperature changes, so it requires additional consideration on adjusting operations of the memory specifically based on temperature changes.

SUMMARY

The present invention provides a 3D IC, which may predict a temperature rise of a memory when the memory is heated by other chips, and adjust a refresh period or a refresh frequency of the memory in advance.

A 3D IC of the present invention includes a plurality of chips, at least one through silicon via (TSV) structure, and a temperature sensor. The chips are stacked in the 3D IC. The TSV structure penetrates the chips. The temperature sensor is disposed in a first chip of the chips. The temperature sensor is disposed close to the TSV structure, and is configure to sense a temperature sensing result corresponding to a temperature of the TSV structure.

Based on the above, the 3D IC of the foregoing embodiments may obtain the temperature sensing result corresponding to the TSV structure by the temperature sensor, to adjust the refresh period of the memory array in advance, thereby avoiding data loss.

DESCRIPTION OF THE EMBODIMENTS

Figure 1:
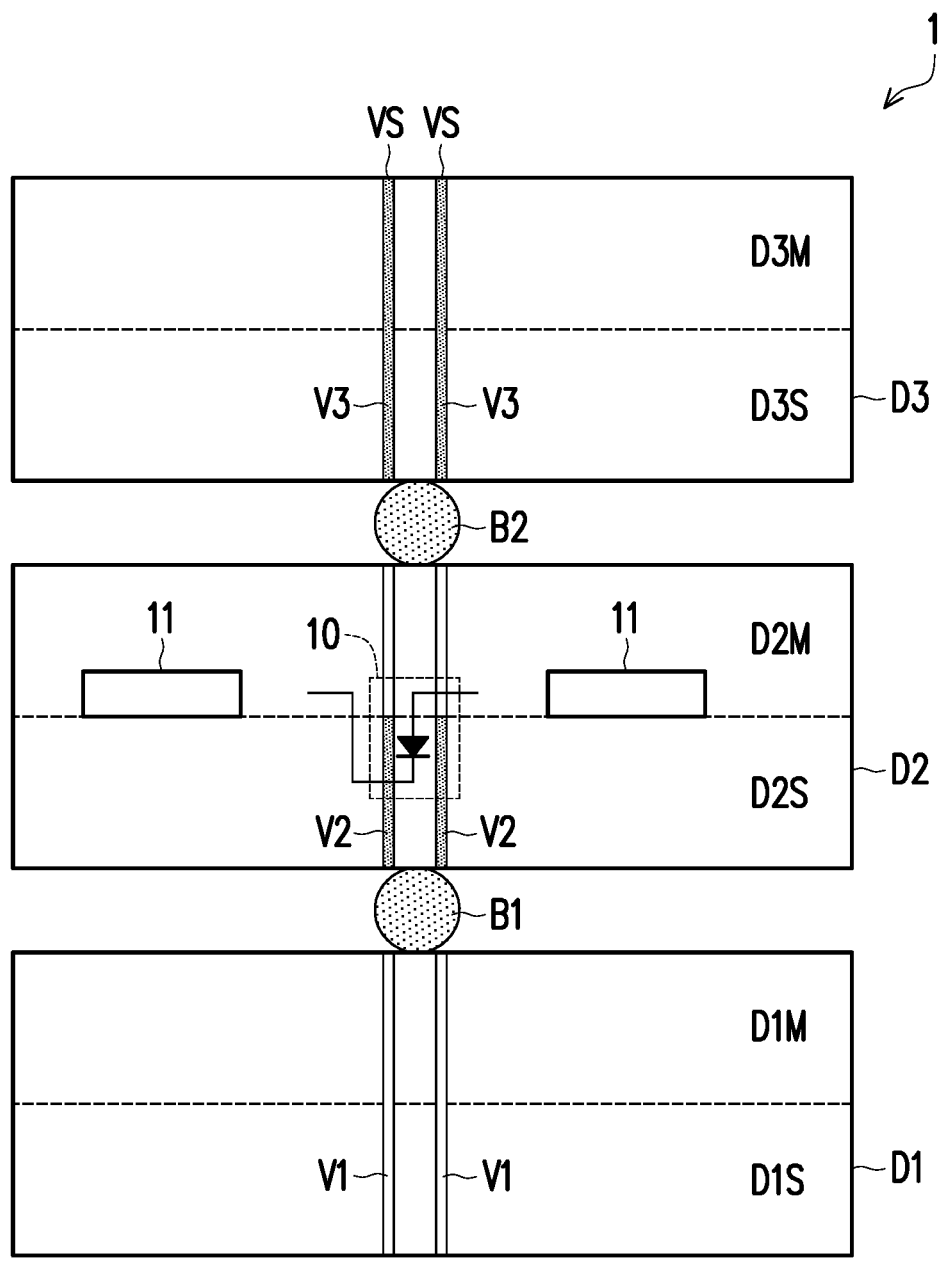
FIG. 1 is a cross-sectional view of a 3D IC according to some embodiments of the present invention.

Referring to FIG. 1, a 3D IC 1 includes chips D1-D3, a TSV structure VS, a temperature sensor 10 and a memory array 11. In the 3D IC 1, chips D1-D3 are stacked sequentially in a vertical direction to form a three-dimensional structure. The chip D2 between the chips D1 and D3 is provided with a temperature sensor 10 and a memory array 11. The temperature sensor 10 is disposed close to the TSV structure VS. The TSV structure VS is disposed penetrating the chips D1-D3 and is connected in the vertical direction. Specifically, the 3D IC 1 may increase a transistor density in each unit area by stacking multiple chips D1-D3 in a vertical direction, thus achieving advantages of, for example, reducing the packaged area of 3D IC 1. The memory array 11 in chip D2 may, for example, include a plurality of dynamic random-access memory (DRAM) elements, and is more vulnerable to temperature variations. Therefore, temperature sensing can be realized through the detection performed by the temperature sensor 10 disposed on the substrate of the same chip, so as to adjust the operations (for example, the refresh period) of the memory array 11. The temperature sensor 10 may, for example, include a thermal diode, a thermistor, or other temperature sensors implemented by field effect transistors or bipolar transistors.

Specifically, although it is not clearly illustrated, each of the chips D1-D3 may be selectively disposed with semiconductor elements and patterned wires for providing electrical connections to these semiconductor elements, so that designed circuit logics may be realized by semiconductor components on the chips D1-D3 through pre-planned circuit layouts. Further, these semiconductor components consume power as they operate, thus becoming various heat sources in each chip D1-D3. For the chip D2 in the 3D IC 1, due to the three-dimensional stacking structure of the 3D IC 1, the heat of the chip D2 in the middle layer is easier to accumulate but more difficult to dissipate, so the temperature of the chip D2 is more likely to be affected by other layers of chips. Therefore, in order to accurately evaluate the temperature on the chip D2, or to evaluate how the chip D2 is influenced by other layers of chips more accurately, the temperature sensor 10 is set adjacent to the TSV structure VS to generate a temperature sensing result corresponding to the TSV structure VS.

The TSV structure VS is disposed penetrating the chips D1-D3. The chip D1, for example, includes a substrate D1S and a metal structure D1M disposed on the substrate D1S. The chip D2, for example, includes a substrate D2S and a metal structure D2M disposed on the substrate D2S. The chip D3, for example, includes a substrate D3S and a metal structure D3M disposed on the substrate D3S. Specifically, each chip includes a substrate and a metal structure above the substrate, and the metal structure may include a plurality of metal layers at different heights for disposing patterned metal wires. The TSV structure VS penetrates these substrates and metal structures. The TSV structure VS includes a plurality of TSVs V1-V3, respectively disposed in the substrates of the chips D1-D3. The TSV V1 penetrates the substrate D1S and the metal structure D1M of the chip D1. The TSV V2 penetrates the substrate D2S and the metal structure D2M of the chip D2. The TSV V3 penetrates the substrate D3S and the metal structure D3M of the chip D3. The TSVs V1-V3 are connected by micro-bumps B1, B2 (or also referred as solder balls). Specifically, the TSVs V1-V3 and the micro-bumps B1, B2 are formed by conductive materials, and a thermal conductivity coefficient of the overall TSV structure VS is greater than a thermal conductivity coefficient of the substrate, so in some implementations, and thus some redundant TSVs and micro bumps may be used to help dissipating heat from the chips. In some embodiments, the TSVs used to transfer heat may be redundant which are not connected to the wires of any metal layer in the metal structure, thereby avoiding additional heat generated during the transmission of electrical signals, which will continue to be accumulated in the TSVs, and resulting in inaccurate temperature sensing results.

Further, the TSVs V1-V3 arranged in each chip D1-D3 are respectively in contact with the substrates of each chip D1-D3, and metal contacts may be provided in the metal structure of each D1-D3 to electrically coupled to each TSV V1-V3 based on different design requirements, so as to realize dissipating heat across different layers of chips in the 3D IC 1. On the other hand, since the TSVs V1~V3 and the micro-bumps B1, B2 are formed through conductive materials, so the TSV structure VS as a whole possess a better thermal conductivity than that of the substrates of the chips D1~D3 and a filling material between chips. In other words, the thermal conductivity coefficient of the TSV structure VS is greater than the thermal conductivity coefficient of the substrate of each chip D1-D3. As such, through the TSV structure VS directly contacting the substrate of each chip D1-D3, the TSV structure VS can also provide an additional heat dissipating path in the vertical direction in the 3D IC 1. Compared with the temperature variations on the chip D2 which may be caused by heat dissipation through air or other supporting structures, the temperature change caused by the heat flow transmitted by the structure, the temperature of the TSV structure VS may be heated by the chip D1 or D3 earlier. Therefore, by monitoring the temperature of TSV structure VS, a trend of the temperature changes of the chip D2 caused by other chips D1 and D3 can be known in advance by monitoring the temperature of the TSV structure VS.

Since operations of the memory array 11 in the chip D2 is more sensitive to temperature, in addition to the thermal energy that the memory array 11 itself generates during operation, it is also necessary to monitor the heat dissipated from other chip layers (such as the adjacent chips D1, D3). Under such a circumstance, the temperature sensor 10 is disposed close to the TSV structure VS on the chip 10, and monitors heat of other layers of chips leveraging the thermal conductivity of the TSV structure VS, so the sensor 10 may be used to generate the temperature sensing results corresponding to the TSV structure VS temperature, serving as a reference while operating the memory array 11.

Specifically, in order to accurately determine the influence of the heat on the chips D1 and D3 does to the temperature of the chip D2, the TSV structure VS used for transferring heat flow is redundant in the 3D IC 1. That is, the entire TSV structure VS is designed to be electrically floating or coupled to a reference voltage of a fixed level, so as to eliminate the additional influence of the signal transmission on the thermal energy. In this case, the TSV structure VS may be of course remain to be open or disconnected from the temperature sensor 10.

In an embodiment, a controller (not shown in FIG. 1) is also disposed on the chip D2, coupling to the temperature sensor 10 and the memory array 11. The controller may receive the temperature sensing result generated by the memory array 11, and increases the refresh frequency of the memory array 11 when the temperature of the TSV structure VS is greater than a temperature threshold. In other words, when it is determined by the controller that the temperature on the TSV structure VS is greater than the temperature threshold, it may represent that one of the chips D1 or D3 which is above or below the chip D2 is at a temperature greater than the temperature threshold, and is heating the chip D2. Since the temperature rising rate of the TSV is higher than that of the substrate, the controller may adjust and increase the refresh frequency of memory array 11 in advance in such a circumstance that the temperature of the TSV structure VS is determined to be greater than the temperature threshold, thereby avoiding data loss of stored in memory array 11 due to the upcoming temperature rise.

Figure 2:
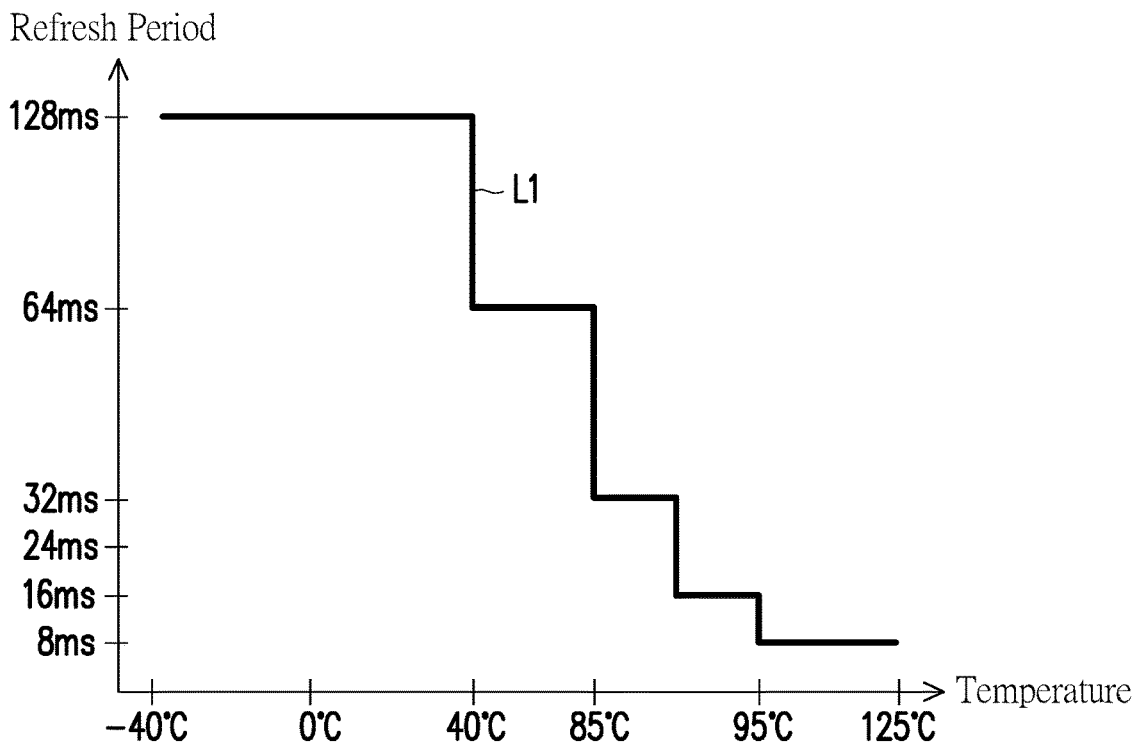
FIG. 2 is a relationship diagram between a refresh period and a temperature of a memory array 11 in FIG. 1.

FIG. 2 is a relationship diagram between a refresh period and the temperature of the memory array 11 in FIG. 1. As shown in the broken line L1, the relationship between the refresh period and the temperature in the memory array 11 may have multiple turning points. When each time the temperature of the memory array changes and crosses these turning points, the refresh period also requires to be adjusted accordingly. The temperature values corresponding to these turning points may be stored in the controller as one or more temperature thresholds, so that the refresh period or refresh frequency of the memory array 11 may be operated in the corresponding interval to maintain the storage data of the memory array 11 to be correct.

In one embodiment, when the controller determines that the temperature of the TSV structure VS exceeds one of the temperature thresholds as shown in FIG. 2 during the beating process, the controller may accordingly lower the refresh period of the memory array 11 (i.e., increase the refresh frequency of the memory array 11). In other words, the controller may monitor the temperature sensing results provided by the temperature sensor 10 in real time. When the temperature sensing result shows that the temperature of the TSV structure VS crosses one of the temperature thresholds during the rising process, the refresh period of the memory array 11 may be correspondingly lowered.

In an embodiment, in addition to the temperature sensor 10 (e.g., the first temperature sensor) adjacent to the TSV structure VS is disposed in the chip D2, another temperature sensor (e.g., the second temperature sensor) may also be disposed in the memory array 11. The first temperature sensor and the second temperature sensor may respectively generate the first temperature sensing result and the second temperature sensing result, respectively corresponding to the temperatures of the TSV structure VS and the memory array 11. In this way, the controller may adjust operations of the memory array 11 not only according to the temperature of the TSV structure VS showed by the first temperature sensing result but also according to the temperature of the memory array 11 showed by the second temperature sensing result.

In an embodiment, the controller may increase the refresh frequency of the memory array 11 when the first temperature sensing result shows that the temperature of the TSV structure VS is greater than the temperature threshold, and the second temperature sensing result shows that the temperature of the memory array 11 is less than the temperature threshold. Under such a circumstance, when the temperature of the TSV structure VS is greater than the temperature of memory array 11, it means that heat is flowing to the chip D2 and causes the temperatures of the chip D2 and the memory array 11 to rise. In this way, the controller is going to adjust and increase the refresh frequency of the memory array 11 in advance when it is determined that the temperature of the TSV structure VS is rising to be greater than the temperature threshold, even before the temperatures of the chip D2 or the memory array 11 are exceeding the temperature threshold, so that data loss can be avoided.

In an embodiment, the operations of adjusting the refresh frequency of the memory array 11 in advance in the foregoing embodiment is not only limited to be performed when the temperature of the memory array 11 is less than the temperature threshold, but also limited when a temperature difference between the temperature of the memory array 11 and the temperature threshold is less than a preset temperature range. For example, the controller may be configured to only perform the adjustment of refresh operations to the memory array 11 in advance when it is determined that the temperature of the memory array 11 is within 10° C. below the temperature threshold. As such, when the temperature of the memory array 11 is lower than the temperature threshold, and lower than the temperature threshold more than 10° C., the controller will not increase the memory array 11 refresh frequency even if it is determined by the controller that the temperature of the TSV structure VS is greater than the temperature threshold. Since the memory array 11 is still at state corresponding to a relatively low temperature at this moment, and the heat dissipated from other chips will not cause data loss of the memory array 11 in a short time.

On the other hand, the controller needs to control the refresh period of the memory array 11 according to the temperature of the memory array 11 during the process of cooling down. Therefore, the controller only increases the refresh period of the memory array 11 only if the first temperature sensing result and the second temperature sensing result both show that the temperatures of the TSV structure VS and the memory array 11 are less than the temperature threshold. If only one of the temperatures of the memory array 11 or the temperature of the TSV structure VS drops below the temperature threshold, the controller will maintain the refresh period setting of the memory array 11 to ensure the stored data correct.

Figure 3:
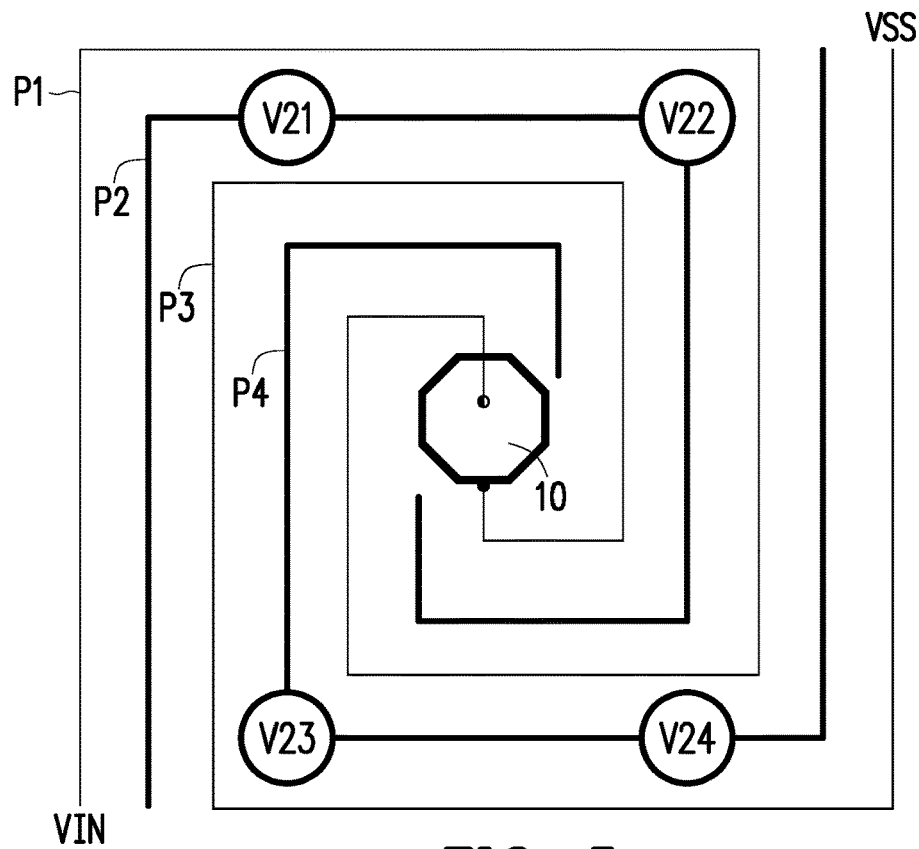
FIG. 3 is a top view of a chip according to some embodiments of the present invention.

FIG. 3 is a top view of the chip D2 according to some embodiments of the present invention. TSV structures V21-V24 and temperature sensor 10 are disposed on the chip D2. Particularly, FIG. 3 is for illustrating positional relationships between the TSV structures V21-V24 and the temperature sensor 10, and how the temperature sensor 10 accurately senses the temperature of the TSV structures V21-V24. Thus, some circuit structures (such as the controller and the memory array, etc.) on the chip D2 are omitted in FIG. 3.

Specifically, the TSV structures V21-V24 are disposed on the chip D2. The TSV structures V21-V24 are not only disposed adjacent to the temperature sensor 10, but also spirally arranged around using the temperature sensor 10 as the center. As such, the temperature changes brought by the TSV structures V21-V24 may be evenly transmitted to the temperature sensor 10. In another aspect, in addition to strengthening the sensing of the temperature sensor 10 through the positional relationship between the TSV structures V21-V24 and the temperature sensor 10, there are also wires P1-P4 disposed on the chip D2 spirally around the temperature sensor 10, further enhancing the heat conduction effect between the TSV structures V21-V24 and the temperature sensor 10.

Specifically, the wires P1-P4 are disposed on the chip D2 in a manner of interlacing and spirally around the temperature sensor 10, and the wires P1-P4 are disposed on a metal layer of the same height in the metal structure D2M of the chip D2. The wire P1 is, for example, disconnected from the wire P2. Among the wires P1-P4, the wires P1 and P3 are coupled to the temperature sensor 10, and may be used as transmission wires of a reference ground voltage VSS and the input signal VIN the temperature sensor 10 for the temperature sensor 10. In addition, the wire P2 is coupled to the TSV structures V21, V22, and the wire P4 is coupled to TSV structures V23, V24. As such, a heat exchange rate between the TSV structures V21-V24 and the temperature sensor 10 may be accelerated by disposing the wires P1~P4 around the temperature sensor 10. The temperature sensing result generated by the temperature sensor 10 may reflect changes on the temperature of the TSV structures V21-V24, allowing the controller to accordingly adjust the refresh frequency of the memory array 11 real time.

In an embodiment, the shapes, positions, structures and quantities of the TSV structures V21-V24 and the wires P1-P4 disposed on the chip D2 may be adaptively adjusted based on different design requirements. For example, the wires P1-P4 may be disposed on metal layers of different heights in the metal structure D2M of the chip D2, but the wires P1-P4 may still be dispose spirally around the temperature sensor 10, so as to increase contact area of the wires P1-P4 and the heat exchange rate between the perforated structures V21-V24 and the temperature sensor 10. Alternatively, the wires coupled to the TSV structures V21-V24 are not limited to two, and are also not limited to the manner of spirally around. For example, the wires coupled to the TSV structures V21-V24 may have a zigzag or grid structure, which can also achieve the effect of increasing the contact area.

In summary, the 3D IC of the above embodiment can generate a temperature sensing result corresponding to the temperature of the TSV structure by the temperature sensor disposed close to the TSV structure. Accordingly, the temperature rise of the memory array may be predicted based on the sensing result generated by the temperature sensor, and further adjust the refresh period of the memory array in advance, thereby effectively preventing the data loss stored in the memory array and keeping the data stored in the memory array correct.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional integrated circuit (3D IC), comprising:
   a plurality of chips, the plurality of chips being stacked in the 3D IC;
   at least one through silicon via (TSV) structure, penetrating the plurality of chips; and
   a temperature sensor, disposed on a first chip of the plurality of chips, the temperature sensor being disposed close to the at least one TSV structure, and configured to sense a first temperature sensing result corresponding to a temperature of the at least one TSV structure,
   wherein a thermal conductivity coefficient of the at least one TSV structure is greater than a thermal conductivity coefficient of a substrate of the plurality of chips.

2. The 3D IC of claim 1, further comprising:
   a memory array, disposed on the first chip; and
   a controller, coupled to the temperature sensor, and configured to increase a refresh frequency of the memory array when the first temperature sensing result shows that a temperature of the at least one TSV structure is greater than a temperature threshold.

3. The 3D IC of claim 2, wherein the temperature sensor is a first temperature sensor, the 3D IC further comprising:
   a second temperature sensor, disposed close to the memory array, and configured to sense a second temperature sensing result corresponding to a temperature of the memory array.

4. The 3D IC of claim 3, wherein the controller increases the refresh frequency of the memory array when the second temperature sensing result shows that the temperature of the memory array is less than the temperature threshold.

5. The 3D IC of claim 3, wherein the controller increases the refresh frequency of the memory array when a temperature difference between the temperature of the memory array and the temperature threshold is less than a preset temperature range.

6. The 3D IC of claim 3, wherein the controller increases a refresh period of the memory array when the first temperature sensing result and the second temperature sensing result both show that the temperatures of the at least one TSV structure and the memory array are less than the temperature threshold.

7. The 3D IC of claim 1, wherein the temperature sensor is disconnected from the at least one TSV structure.

8. The 3D IC of claim 1, further comprising:
 a first wire, coupled to the at least one TSV structure, and disposed on the first chip; and
 a second wire, coupled to the temperature sensor, and disposed on the first chip,
 wherein the first wire and the second wire both disposed spirally around using the temperature sensor as a center.

9. The 3D IC of claim 8, wherein the first wire and the second wire are disposed on the first chip in a manner of interlacing and spirally around the temperature sensor.

10. The 3D IC of claim 8, wherein the first wire and the second wire are disposed on a same metal layer of the first chip.

11. The 3D IC of claim 8, wherein the second wire are utilized for providing transmissions of an input signal or a reference voltage for the temperature sensor.

12. The 3D IC of claim 8, wherein the first wire and the second wire are disposed on different metal layers of the first chip.

13. The 3D IC of claim 1, wherein the at least one TSV structure is redundant.

* * * * *